(12) United States Patent
Ogura et al.

(10) Patent No.: US 10,324,461 B2
(45) Date of Patent: Jun. 18, 2019

(54) REMOTE CONTROL APPARATUS

(71) Applicant: YANMAR CO., LTD., Osaka-shi, Osaka (JP)

(72) Inventors: Kouhei Ogura, Osaka (JP); Wataru Nakagawa, Osaka (JP); Keiji Matsumoto, Osaka (JP); Akifumi Kuroda, Osaka (JP)

(73) Assignee: YANMAR CO., LTD., Osaka (JP)

(*) Notice: Subject to any disclaimer, the term of this patent is extended or adjusted under 35 U.S.C. 154(b) by 0 days.

(21) Appl. No.: 15/329,798

(22) PCT Filed: Jul. 2, 2015

(86) PCT No.: PCT/JP2015/069119
§ 371 (c)(1),
(2) Date: Jan. 27, 2017

(87) PCT Pub. No.: WO2016/017367
PCT Pub. Date: Feb. 4, 2016

(65) Prior Publication Data
US 2017/0248946 A1    Aug. 31, 2017

(30) Foreign Application Priority Data

Jul. 30, 2014  (JP) ................. 2014-155099
Jul. 30, 2014  (JP) ................. 2014-155100
Jul. 30, 2014  (JP) ................. 2014-155101

(51) Int. Cl.
| | |
|---|---|
| *G05D 1/00* | (2006.01) |
| *A01B 69/00* | (2006.01) |
| *B60R 1/00* | (2006.01) |
| *G05D 1/02* | (2006.01) |
| *H04N 7/18* | (2006.01) |
| *H04Q 9/00* | (2006.01) |

(Continued)

(52) U.S. Cl.
CPC ........... *G05D 1/0016* (2013.01); *A01B 69/00* (2013.01); *A01B 69/001* (2013.01);
(Continued)

(58) Field of Classification Search
None
See application file for complete search history.

(56) References Cited

U.S. PATENT DOCUMENTS 9,014,904 B2 * 4/2015 Higgins-Luthman ........................
H04N 5/23229
382/104
9,603,300 B2 * 3/2017 Pettersson ............ A01D 34/008
(Continued)

FOREIGN PATENT DOCUMENTS

CN    1395641 A    2/2003
JP    09-271016 A    10/1997
(Continued)

OTHER PUBLICATIONS

International Search Report dated Oct. 6, 2015 issued in corresponding PCT application No. PCT/JP2015/069119.
(Continued)

*Primary Examiner* — Truc M Do
(74) *Attorney, Agent, or Firm* — Norton Rose Fulbright US LLP

(57) ABSTRACT

A remote control apparatus capable of communicating with a control apparatus of an autonomously running work vehicle via a communication apparatus, the remote control apparatus comprising a communication apparatus, a control apparatus, a display apparatus, and cameras for obtaining images of the front and rear, wherein the display apparatus is provided with at least a remote control region for controlling the autonomously running work vehicle, a peripheral image region for displaying images captured by the cameras, and a work status display region, wherein the peripheral image region is provided with a frontal view and a rear view.

20 Claims, 12 Drawing Sheets

(51) Int. Cl.

| | |
|---|---|
| *A01B 69/04* | (2006.01) |
| *G01S 19/14* | (2010.01) |
| *G08C 17/02* | (2006.01) |
| *H04N 5/232* | (2006.01) |
| *H04N 5/445* | (2011.01) |
| *G06F 3/0481* | (2013.01) |
| *G06F 3/0488* | (2013.01) |
| *H04Q 9/02* | (2006.01) |

(52) U.S. Cl.
CPC .............. *A01B 69/008* (2013.01); *B60R 1/00* (2013.01); *G01S 19/14* (2013.01); *G05D 1/0022* (2013.01); *G05D 1/0038* (2013.01); *G05D 1/02* (2013.01); *G08C 17/02* (2013.01); *H04N 5/23293* (2013.01); *H04N 5/44591* (2013.01); *H04N 7/18* (2013.01); *H04N 7/181* (2013.01); *H04Q 9/00* (2013.01); *B60R 2300/50* (2013.01); *B60R 2300/80* (2013.01); *G05D 2201/0201* (2013.01); *G06F 3/0488* (2013.01); *G06F 3/04817* (2013.01); *G06F 2203/04803* (2013.01); *G08C 2201/30* (2013.01); *G08C 2201/91* (2013.01); *G08C 2201/93* (2013.01); *H04Q 9/02* (2013.01)

(56) References Cited

U.S. PATENT DOCUMENTS

| | | | | |
|---|---|---|---|---|
| 9,841,768 | B2* | 12/2017 | Hiramatsu | G05D 1/0278 |
| 2006/0224280 | A1* | 10/2006 | Flanigan | A63H 30/04 |
| | | | | 701/2 |
| 2007/0057816 | A1* | 3/2007 | Sakakibara | B62D 15/027 |
| | | | | 340/932.2 |
| 2008/0154504 | A1* | 6/2008 | Hein | G01S 1/68 |
| | | | | 701/300 |
| 2010/0063672 | A1* | 3/2010 | Anderson | G05D 1/0077 |
| | | | | 701/29.2 |
| 2010/0063954 | A1* | 3/2010 | Anderson | G05D 1/0221 |
| | | | | 706/50 |
| 2010/0076631 | A1* | 3/2010 | Mian | G05D 1/0229 |
| | | | | 701/19 |
| 2012/0185123 | A1* | 7/2012 | Ansari | G05D 1/0276 |
| | | | | 701/25 |
| 2014/0316633 | A1* | 10/2014 | Tsujimoto | G05D 1/0223 |
| | | | | 701/23 |
| 2015/0163993 | A1* | 6/2015 | Pettersson | A01D 34/008 |
| | | | | 701/28 |
| 2015/0296707 | A1* | 10/2015 | Fukuda | A01D 34/008 |
| | | | | 701/25 |

FOREIGN PATENT DOCUMENTS

| | | |
|---|---|---|
| JP | 2006-221339 A | 8/2006 |
| JP | 2011-120539 A | 6/2011 |

OTHER PUBLICATIONS

Chinese Office Action dated Sep. 20, 2018 issued in corresponding CN Application No. 201580041953.5.

* cited by examiner

REMOTE CONTROL APPARATUS

CROSS-REFERENCE TO RELATED APPLICATIONS

This is a national phase application based on the PCT International Patent Application No. PCT/JP2015/069119 filed Jul. 2, 2015, claiming priority to Japanese Patent Application Nos. 2014-155099, 2014-155100 and 2014-155101 filed Jul. 30, 2014, the entire contents of all of which are incorporated herein by reference.

TECHNICAL FIELD

The present invention relates to a remote control apparatus of an unmanned autonomously moving work vehicle traveling autonomously and a display art of a display device provided in the remote control apparatus.

BACKGROUND ART

Conventionally, an art in which a work machine attached to a tractor and working and a mobile phone are provided, the work machine has a receiving part receiving a wireless operation signal from the mobile phone and a control part controlling an output instrument based on the received operation signal, and operation buttons and an operation screen are provided in the mobile phone so that operation can be performed by the operation buttons is known (for example, see the Patent Literature 1).

PRIOR ART REFERENCE

Patent Literature

Patent Literature 1: the Japanese Patent Laid Open Gazette 2011-120539

DISCLOSURE OF INVENTION

Problems to be Solved by the Invention

In the art, only the work machine attached to the tractor can be operated remotely by the mobile phone, and the tractor cannot be operated remotely. Recently, the tractor can travel unmannedly and can be operated remotely. However, a screen of a remote control apparatus displays an engine rotation speed, a work distance and the like, and a front side and a work state is not displayed and cannot be checked while working, whereby information required for the work cannot be displayed.

The present invention is provided in consideration of the conditions as mentioned above, and the purpose of the invention is to provide a remote control apparatus in which an image of the surrounding, operation buttons and the like can be displayed by a display device of the remote control apparatus.

Means for Solving the Problems

The problems to be solved by the present invention have been described above, and subsequently, the means of solving the problems will be described below.

According to the present invention, in a remote control apparatus in which a control device of an autonomously moving work vehicle which can perform travel and work automatically along a set travel route using a satellite positioning system can be communicated via a communication device connected to the control device wirelessly, the remote control apparatus has the communication device, the control device and a display device, and the display device has at least a remote control area operating the autonomously moving work vehicle and a circumference image area displaying an image photographed by a camera attached to the autonomously moving work vehicle.

According to the present invention, the display device can display a work state display area displaying a map of a field on which the autonomously moving work vehicle works, the travel route, an actual position and a worked position in addition to the remote control area and the circumference image area.

According to the present invention, the remote control area, the circumference image area and the work state display area can be displayed simultaneously by being divided laterally or vertically.

According to the present invention, display positions of the remote control area, the circumference image area and the work state display area and selection of plural display and full screen display can be changed optionally.

According to the present invention, a camera photographing a front side and a rear side is attached to the autonomously moving work vehicle, a front screen displaying an image of the front side of the autonomously moving work vehicle photographed by camera and a rear screen displaying an image of the rear side are provided in the display device of the remote control apparatus, and the display device can be switched to two-display displaying the front screen and the rear screen and one-display displaying only a traveling direction.

According to the present invention, in the case of switching the display device to the one-display and in the case of the vertical two-display, the autonomously moving work vehicle travels along the set travel route, and at a set time before switching the traveling direction longitudinally, the screen of the display device is switched corresponding to a scheduled traveling direction.

Effect of the Invention

According to the above means, by one remote operation apparatus (operation terminal), one or a plurality of required screens can be displayed, the autonomously moving work vehicle can be operated easily by the remote control apparatus, and the display device of the remote control apparatus can display the screens selectively at a legible position.

DETAILED DESCRIPTION OF THE INVENTION

An embodiment in which an autonomously moving work vehicle 1 which can travel automatically unmannedly and an auxiliary moving work vehicle 100 operated and steered by an operator so as to travel following the autonomously moving work vehicle 1 are tractors, and rotary tilling devices 24 are attached as work machines to the autonomously moving work vehicle 1 and the auxiliary moving work vehicle 100 is explained. The work vehicles are not limited to the tractors and may alternatively be combines or the like. The work machines are not limited to the rotary tilling devices 24 and may alternatively be fertilizing and seeding machines, mowers, chemical spraying machines, disinfecting machines, harvesting machines or the like.

Figure 1:
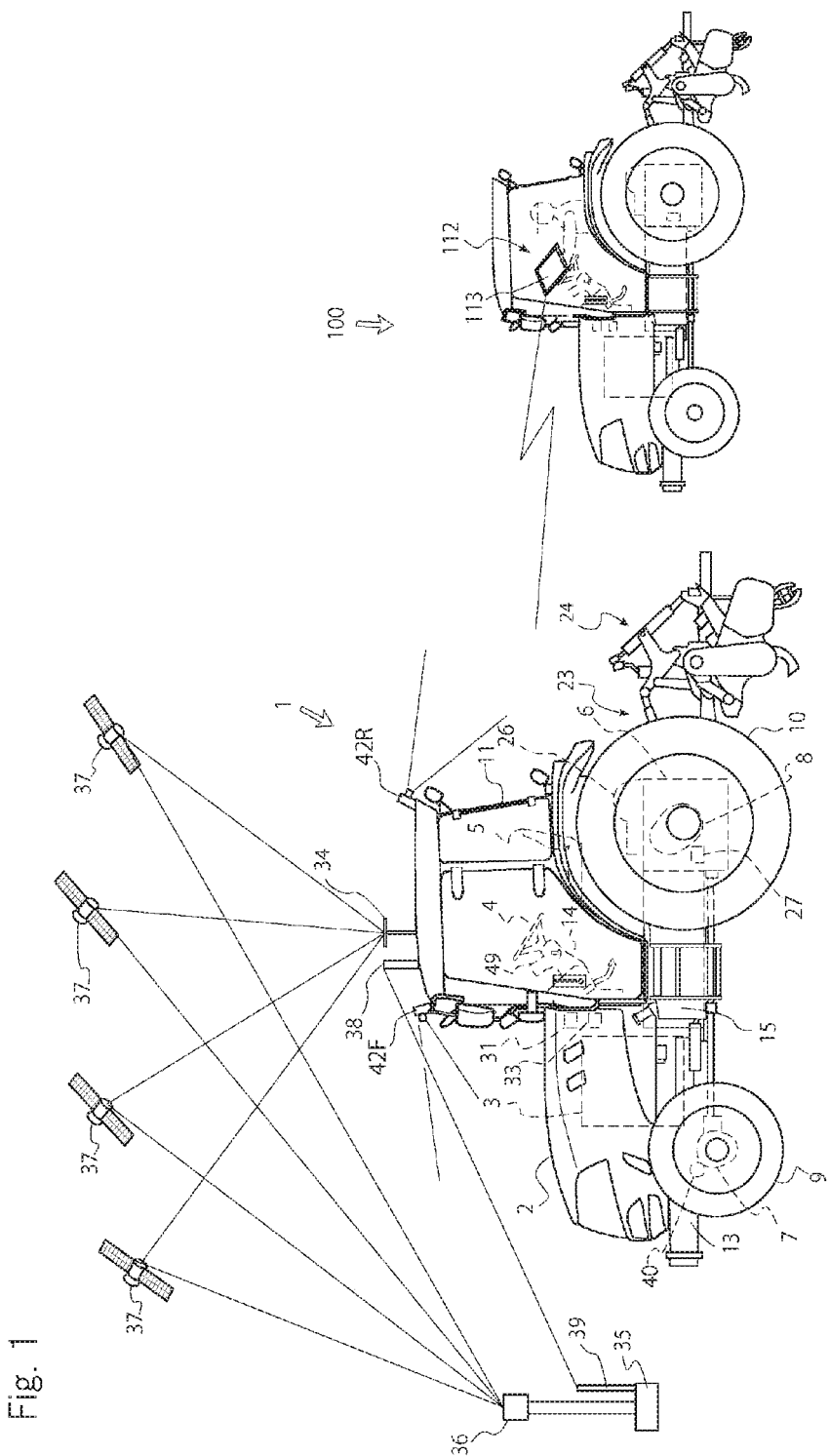
FIG. 1 is a schematic side view of an autonomously moving work vehicle operated by a remote control apparatus.
Figure 2:
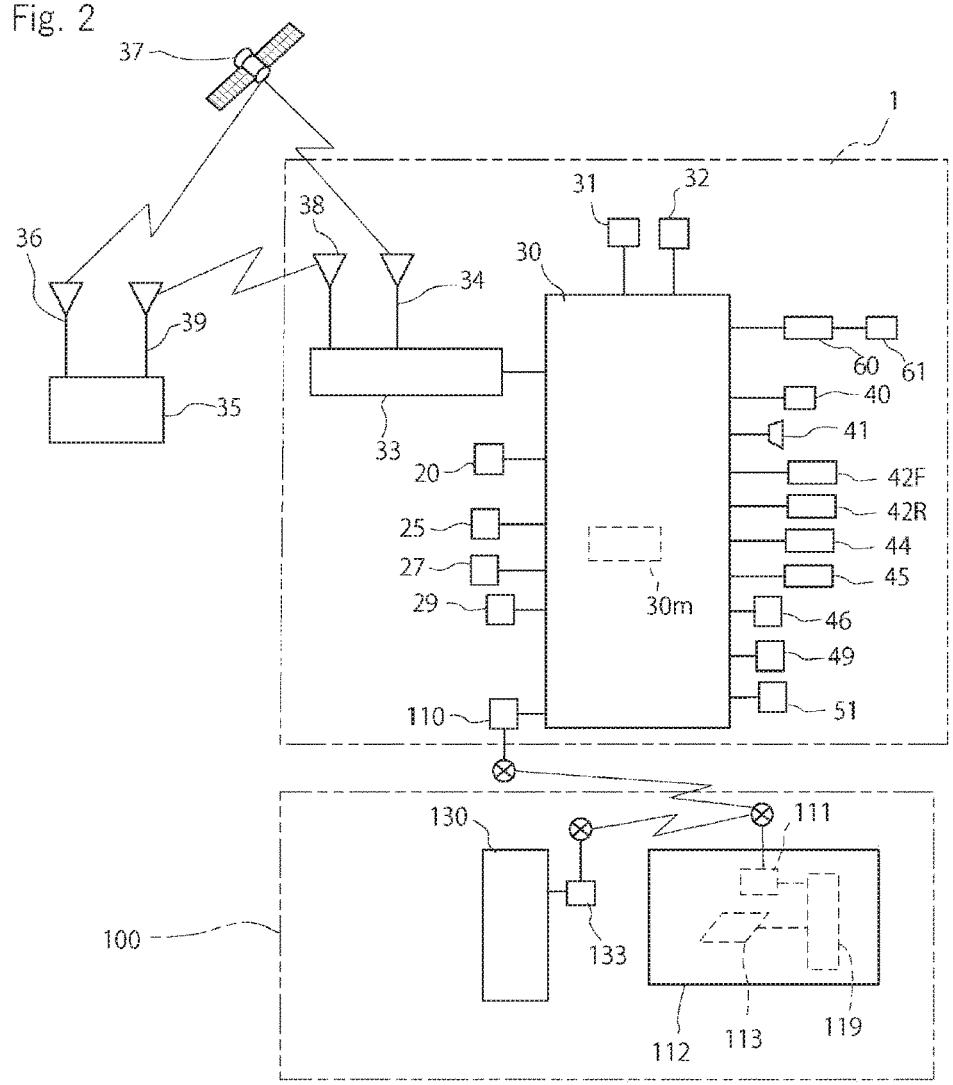
FIG. 2 is a control block diagram.

An entire configuration of the tractor which is the autonomously moving work vehicle 1 is explained referring to FIGS. 1 and 2. An engine 3 is provided in a bonnet 2, a dashboard 14 is provided in a cabin 11 behind the bonnet 2, and a steering wheel 4 which is a steering operation means is provided on the dashboard 14. By rotating the steering wheel 4, a direction of front wheels 9 is rotated via a steering device. A steering direction of the autonomously moving work vehicle 1 is detected by a steering sensor 20. The steering sensor 20 includes an angle sensor such as a rotary encoder and arranged at a rotation base of the front wheels 9. A detection configuration of the steering sensor 20 is not limited and any configuration which recognizes the steering direction may be used. Rotation of the steering wheel 4 may be recognized, or an operation amount of power steering may be recognized. A detection value obtained by the steering sensor 20 is inputted into a control device 30. The control device 30 has a CPU (central processing unit), a storage device 30m such as a RAM or a ROM, an interface and the like, and programs, data and the like for operating the autonomously moving work vehicle 1 are stored in the storage device 30m.

A seat 5 is disposed behind the steering wheel 4, and a transmission casing 6 is arranged below the seat 5. At left aid right sides of the transmission casing 6, rear axle casings 8 are provided continuously, and rear wheels 10 are supported via axles by the rear axle casings 8. Power from the engine 3 is changed in speed by a transmission (a main transmission and a sub transmission) in the transmission casing 6 and can drive the rear wheels 10. For example, the transmission includes a hydraulic stepless transmission, and a movable swash plate of a variable capacity hydraulic pump is operated by a speed change means 44 such as a motor so as to perform the speed change. The speed change means 44 is connected to the control device 30. A rotation speed of the rear wheels 10 is detected by a vehicle speed sensor 27, and inputted into the control device 30 as a traveling speed. A detection method of a vehicle speed and an arrangement position of the vehicle speed sensor 27 are not limited.

A PTO clutch and a PTO transmission are housed in the transmission casing 6. The PTO clutch is engaged and disengaged by a PTO switching means 45. The PTO switching means 45 is connected to the control device 30 so as to control connection and disconnection of power transmission to a PTO shaft.

A front axle casing 7 is supported by a front frame 13 supporting the engine 3 and the front wheels 9 are supported at both sides of the front axle casing 7 so that power from the transmission casing 6 can be transmitted to the front wheels 9. The front wheels 9 are steering wheels and turned by rotation operation of the steering wheel 4, and the front wheels 9 can be steered laterally by a steering actuator 40 including a power steering cylinder which is a driving means of a steering device. The steering actuator 40 is connected to the control device 30 and controlled and driven by an automatic traveling means.

An engine controller 60 which is an engine rotation control means is connected to the control device 30, and an engine rotation speed sensor 61, a water temperature sensor, a hydraulic pressure sensor and the like are connected to the engine controller 60 so as to detect a state of the engine. The engine controller 60 can detect a load from a set rotation speed and an actual rotation speed and perform control so as to prevent overload, and can transmit the state of the engine 3 to a remote control apparatus 112 discussed later so as to display the state of the engine 3 on a display device 113.

In a fuel tank 15 below a step, a level sensor 29 detecting a level of fuel is arranged and connected to the control device 30. In a display means 49 provided in the dashboard of the autonomously moving work vehicle 1, a fuel gauge displaying residual amount of fuel is provided and connected to the control device 30. Information about the fuel residual amount is transmitted from the control device 30 to the remote control apparatus 112, and the fuel residual amount and workable time can be displayed on the display device 113 of the remote control apparatus 112.

On the dashboard 14, the display means 49 displaying a rotation meter of the engine, the fuel gauge, a monitor displaying hydraulic pressure and abnormality, a set value and the like are arranged.

The rotary tilling device 24 is provided movably vertically as the work machine behind a vehicle body of the tractor via a work machine attachment device 23. A lifting cylinder 26 is provided on the transmission casing 6, and by extending and contracting the lifting cylinder 26, a lifting arm constituting the work machine attachment device 23 is rotated so as to move the rotary tilling device 24 vertically. The lifting cylinder 26 is extended and contracted by a lifting actuator 25, and the lifting actuator 25 is connected to the control device 30.

A mobile communication device 33 constituting a satellite positioning system is connected to the control device 30. A mobile GPS antenna 34 and a data reception antenna 38 are connected to the mobile communication device 33, and the mobile GPS antenna 34 and the data reception antenna 38 are provided on the cabin 11. The mobile communication device 33 has a position calculation means and can transmit latitude and longitude to the control device 30 so as to grasp an actual position. In addition to a GPS satellite (America), by using a global navigation satellite system (GNSS) such as a quasi-zenith satellite (Japan) and a GLONASS satellite (Russia), more accurate positioning can be performed. However, this embodiment is explained with the GPS satellite.

A gyro sensor 31 for obtaining information about change of posture of the vehicle body and an azimuth sensor 32 for detecting a traveling direction are provided in the autonomously moving work vehicle 1 and connected to the control device 30. The azimuth sensor 32 can be omitted because the traveling direction can be calculated by position measurement of the GPS.

The gyro sensor 31 detects an angle speed of inclination in a longitudinal direction of the autonomously moving work vehicle 1 (pitch), an angle speed of inclination in a lateral direction thereof (roll) and an angle speed of turning thereof (yaw). By integrating the three angle speeds, the inclination angles in the longitudinal direction and the lateral direction and the turning angle of the autonomously moving work vehicle 1 can be found. As a concrete example of the gyro sensor 31, a mechanical gyro sensor, an optical gyro sensor, a fluid type gyro sensor, a vibration type gyro sensor and the like are mentioned. The gyro sensor 31 is connected to the control device 30 and inputs information about the three angle speeds to the control device 30.

The azimuth sensor 32 detects a direction of the autonomously moving work vehicle 1 (traveling direction). As a concrete example of the azimuth sensor 32, a magnetic azimuth sensor and the like are mentioned. The azimuth sensor 32 is connected to the control device 30 and inputs information about the direction of the vehicle body to the control device 30.

As the above, the control device 30 calculates signals obtained from the gyro sensor 31 and the azimuth sensor 32 by a posture-azimuth calculation means so as to find the posture of the autonomously moving work vehicle 1 (the direction of the vehicle body, the inclination in the longitudinal direction and the lateral direction, and the turning direction).

Next, a method obtaining position information of the autonomously moving work vehicle 1 by the GPS (global positioning system) is explained.

The GPS is a system developed originally for navigation support of an airplane, a ship and the like, and includes twenty four GPS satellites (four satellites in each of six raceway surfaces) going around at an altitude of about 20,000 km, a control station pursuing and controlling the GPS satellites, and a communication device of an user for positioning.

As a positioning method using the GPS, various methods such as independent positioning, relative positioning, DGPS (differential GPS) positioning and RTK-GPS (real time kinematic GPS) positioning are mentioned, and either of these methods can be used. In this embodiment, a RTK-GPS positioning method with high accuracy is adopted and this method is explained referring to FIGS. 1 and 2.

The RTK-GPS (real time kinematic GPS) positioning is a method that GPS observation is performed simultaneously at a reference station whose position is known and a mobile station whose position is to be found, data observed at the reference station is transmitted to the mobile station on real time by a method such as wireless communication, and the position of the mobile station is found on real time based on positional results of the reference station.

In this embodiment, the mobile communication device 33, the mobile GPS antenna 34 and the data reception antenna 38 constituting the mobile station are arranged in the autonomously moving work vehicle 1, and a fixed communication device 35, a fixed GPS antenna 36 and a data transmission antenna 39 constituting the reference station are disposed at a predetermined position not being obstacle of work in the field. In the RTK-GPS (real time kinematic GPS) positioning of this embodiment, measurement of a phase (relative positioning) is performed at both the reference station and the mobile station, and data positioned by the fixed communication device 35 of the reference station is transmitted from the data transmission antenna 39 to the data reception antenna 38.

The mobile GPS antenna 34 arranged in the autonomously moving work vehicle 1 receives signals from GPS satellites 37. The signals are transmitted to the mobile communication device 33 and positioned. Simultaneously, the signals from GPS satellites 37 are received by the fixed GPS antenna 36 which is the reference station, positioned by the fixed communication device 35 and transmitted to the mobile communication device 33, and the measured data are analyzed so as to determine the position of the mobile station. The position information obtained as the above is transmitted to the control device 30.

Accordingly, the control device 30 of the autonomously moving work vehicle 1 has an automatic traveling means traveling automatically. The automatic traveling means receives electric waves transmitted from the GPS satellites 37, finds the position information of the vehicle body at set time intervals in the mobile communication device 33, and finds displacement information and azimuth information of the vehicle body from the gyro sensor 31 and the azimuth sensor 32, and controls the steering actuator 40, the speed change means 44, the lifting actuator 25, the PTO switching means 45, the engine controller 60 and the like so as to make the vehicle body travel along a set route R set previously based on the position information and the azimuth information, thereby working automatically. Position information of an outer perimeter of a field H which is a work range is set previously by a known method and stored in the storage device 30m.

An obstacle sensor 41 is arranged in the autonomously moving work vehicle 1 and connected to the control device 30 so as to prevent contact with the obstacle. For example, the obstacle sensor 41 includes a laser sensor or an ultrasonic sensor, arranged at front, side or rear part of the vehicle body and connected to the control device 30, and detects whether an obstacle exists before, beside or behind the vehicle body and stops the traveling when the obstacle approaches within a set distance.

In the autonomously moving work vehicle 1, a camera 42F photographing a front side and a camera 42R photographing the work machine at a rear side and a state after the work are mounted and connected to the control device 30. In this embodiment, the cameras 42F and 42R are arranged respectively in an upper front part and an upper rear part of a roof of the cabin 11. However, arrangement positions are not limited and may alternatively be an upper front part and an upper rear part of an inside of the cabin 11, or it may be configured that one camera 42 is arranged at a center of the vehicle body and turned around a vertical axis so as to photo the circumference or that a plurality of cameras 42 are arranged at front and rear sides or four corners of the vehicle body so as to photo the circumference. Images photographed by the cameras 42F and 42R are displayed on the display device 113 of the remote control apparatus 112 provided in the auxiliary moving work vehicle 100, and a screen thereof is described later.

The remote control apparatus 112 sets a travel route R of the autonomously moving work vehicle 1, controls the autonomously moving work vehicle 1 remotely, supervises traveling state of the autonomously moving work vehicle 1 and operation state of the work machine, stores work data, and has a control device (CPU and memory) 119, a communication device 111, the display device 113 and the like.

An operator rides on and operates the auxiliary moving work vehicle 100, and the remote control apparatus 112 is mounted on the auxiliary moving work vehicle 100 so as to operate the autonomously moving work vehicle 1. An explanation of a basic configuration of the auxiliary moving work vehicle 100 is omitted because it is substantially the same as the autonomously moving work vehicle 1. The auxiliary moving work vehicle 100 may alternatively have the mobile communication device 33 for the GPS and the mobile GPS antenna 34.

The remote control apparatus 112 can be attached to and detached from an operation part such as a dashboard of the auxiliary moving work vehicle 100 and the autonomously moving work vehicle 1. The remote control apparatus 112 can be operated while being attached to the dashboard of the auxiliary moving work vehicle 100, can be taken out from the auxiliary moving work vehicle 100 and operated while being carried, or can be operated while being attached to the dashboard of the autonomously moving work vehicle 1. For example, the remote control apparatus 112 can be configured by a note-type or tablet-type personal computer. In this embodiment, a tablet-type personal computer is used.

Furthermore, the remote control apparatus 112 and the autonomously moving work vehicle 1 can be communicated with each other on radio, and communication devices 110 and 111 for the communication are provided respectively in the autonomously moving work vehicle 1 and the remote control apparatus 112. Furthermore, the remote control apparatus 112 can be communicated with a control device 130 of the auxiliary moving work vehicle 100 via communication device 133 and 111. The communication device 11 is configured integrally with the remote control apparatus 112. For example, the communication means can be communicated with each other by wireless LAN such as WiFi. In a surface of a casing of the remote control apparatus 112, the display device 113 which is a touch panel-type operation screen which can be operated by touching the screen is provided, and the communication device 111, a CPU and a storage device, a battery and the like are housed in the casing.

Figure 3:
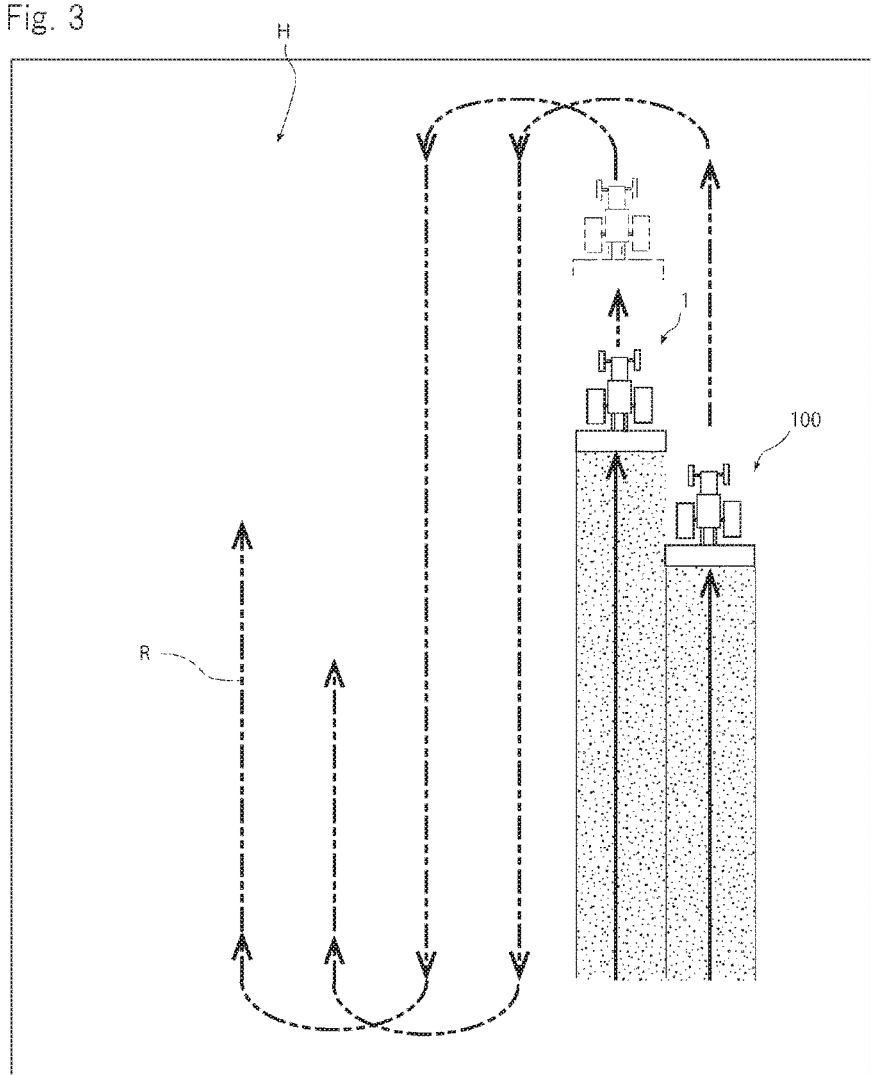
FIG. 3 is a drawing of a state of parallel traveling work by the autonomously moving work vehicle and an auxiliary moving work vehicle.

In this configuration, the set travel route R is set previously in the field H as shown in FIG. 3 and stored in the storage device 30*m* so that the autonomously moving work vehicle 1 can travel along the set travel route R. Map data (information) is referred to for determining a position of the field H, traveling with the satellite positioning system and setting the travel route R. As this map data, map data disclosed in the internet, map data distributed by a map maker or the like, car navigation map data or the like is used.

Work widths of the rotary tilling devices of the autonomously moving work vehicle 1 and the auxiliary moving work vehicle 100 are overlapped partly, and the work is performed while the auxiliary moving work vehicle 100 travels behind aslant the autonomously moving work vehicle 1 in parallel. The auxiliary moving work vehicle 100 may alternatively perform different work while traveling behind the autonomously moving work vehicle 1, and the work mode is not limited.

The images photographed by the cameras 42F and 42R, the state of the autonomously moving work vehicle 1, the state of the work and information concerning the GPS are transmitted via the communication devices 110 and 111 to the control device 119, and the images, information, operation screen and the like can be displayed on the display device 113 of the remote control apparatus 112, whereby an operator can operate the remote control apparatus 112 while supervising the autonomously moving work vehicle 1.

Namely, the display device 113 is a touch operation type screen, and a display method, a display position, an output corresponding to touch operation and the like are controlled by the control device 119. As shown ion FIG. 4, a display screen of the display device 113 can be divided into a plurality of areas longitudinally or laterally, and in the areas, at least, a remote control area 113A operating the autonomously moving work vehicle 1 and a circumference image area 113B displaying the images photographed by the cameras 42F and 42R attached to the autonomously moving work vehicle 1.

The remote control area 113A is a screen in which operation members (buttons) for travel, steering and operation of the work machine of the autonomously moving work vehicle 1 are arranged. In this embodiment, a traveling speed increase button 201U, a traveling speed reduction button 201D, an engine rotation speed increase button 202U, an engine rotation speed reduction button 202D, an automatic travel start button 203, an automatic travel stop button 204, a sudden stop button 205, an internet connection button 206, a work machine lifting button 207U, a work machine lowering button 207D, and a PTO on/off button 208 are arranged. Kinds of the operation buttons are not limited, and a brake button, a PTO speed change button, a steering button, a horn button, a setting button and the like can be provided. Any button can be deleted if it is not operated (it is unnecessary). Meters indicating residual fuel amount, engine rotation speed and the like can be provided. Arrangements in the remote control area 113A and shapes of these buttons are not limited, and can be changed to optional shapes, selected, or changed in position.

By touching the traveling speed increase button 201U, the speed change means 44 is operated so as to increase speed for one stage, and by touching the traveling speed reduction button 201D, the speed change means 44 is operated so as to reduce the speed for one stage. At the time of this operation, it may be configured that name and number of the speed change stage are indicated by popup, or the screen is switched to a screen for the speed change and the other screens are closed.

By touching the engine rotation speed increase button 202U, an accelerator actuator is operated and fuel injection amount is increased so as to increase engine rotation speed, and by touching the engine rotation speed reduction button 202D, the accelerator actuator is operated and the fuel injection amount is reduced so as to reduce the engine rotation speed. At the time of this operation, it may be configured that the engine rotation speed is indicated by popup in digital or analog, or the screen is switched to a screen for the engine rotation speed. By touching continuously the traveling speed increase button 201U, the traveling speed reduction button 201D, the engine rotation speed increase button 202U or the engine rotation speed reduction button 202D, increase amount or reduction amount can be increased or reduced continuously quickly.

By touching the automatic travel start button 203, work is started while traveling automatically on the travel route R set previously, and by touching the automatic travel stop button 204, the automatic travel and the work are stopped. By touching the sudden stop button 205, the engine is stopped so as to stop the travel and the work, thereby preventing dangerous state. The sudden stop button 205 is indicated with relative large size and conspicuous color at a center of the screen so as to be recognized and operated easily. By touching the internet connection button 206, the remote control apparatus is connected to the internet and enters and displays a website set previously.

By touching the work machine lifting button 207U, the lifting actuator 25 is operated so as to lift the rotary tilling device 24, and by touching the work machine lowering button 207D, the lifting actuator 25 is operated so as to lower the rotary tilling device 24. In this operation, the height of the work machine (the rotary tilling device 24) may be indicated by popup in digital or analog, and the screen may be switched to a screen for vertical movement of the work machine. By touching the PTO on/off button 208, the PTO switching means 45 is operated so as to engage or disengage the PTO. Accordingly, by touching the screen with a finger while looking the screen, the autonomously moving work vehicle 1 can be operated easily from a distant position.

The traveling speed, the engine rotation speed and the height of the work machine are set by another screen (not shown).

Figure 8:
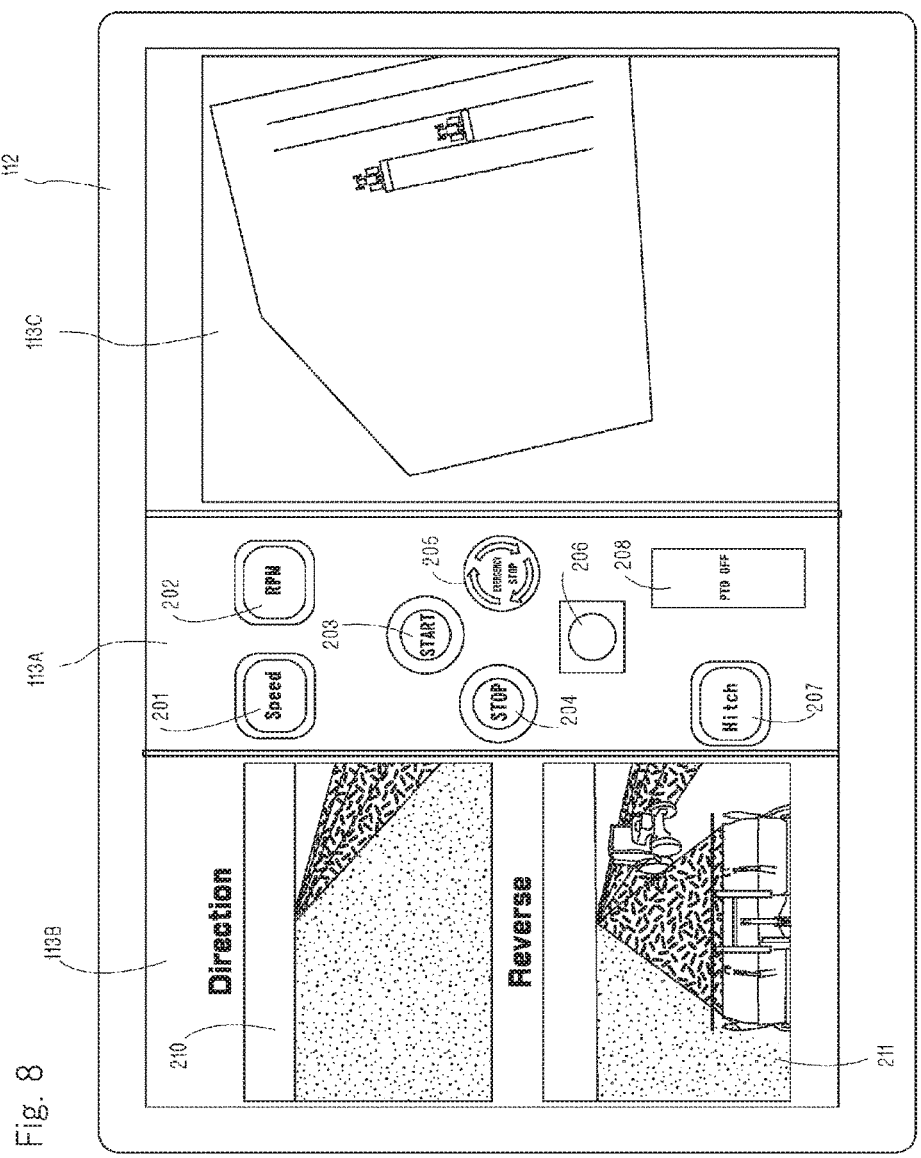
FIG. 8 is a drawing of another display device of the remote control apparatus.

It may alternatively be configured that, among the plurality of the switches arranged in the remote control area 113A, except for the sudden stop button 205 to which immediate response is required in case of emergency, the traveling speed increase button 201U, the traveling speed reduction button 201D, the engine rotation speed increase button 202U, the engine rotation speed reduction button 202D, the work machine lifting button 207U, the work machine lowering button 207D, the automatic travel start button 203, the automatic travel stop button 204, the internet connection button 206, and the PTO on/off button 208 are not operated by one operation, and shift to next screen and are operated by a plurality of operations so as to prevent error operation. In this case, an initial screen is a screen as shown in FIG. 8.

Namely, the automatic travel start button 203 arranged at a substantially center of the remote control area 113A is a button for starting the work while traveling automatically on the travel route R set previously, and by a second operation in addition to a first operation pushing the automatic travel start button 203 (touching), it is shifted to an automatic travel control mode. When the second operation is performed, it is shifted to the automatic travel control mode, and automatic travel control of the autonomously moving work vehicle 1 is performed by the control device 30.

Figure 9:
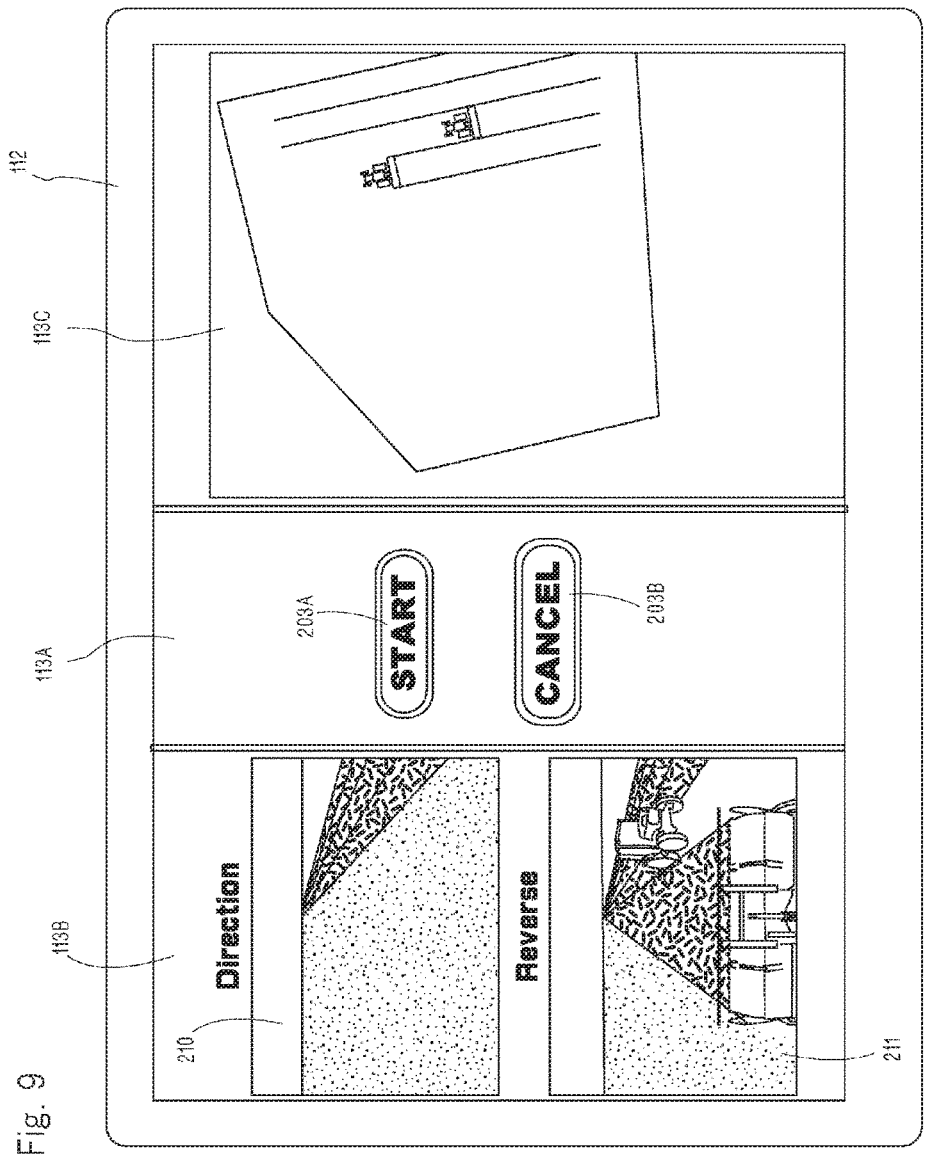
FIG. 9 is a drawing of a second operation screen after pushing an automatic travel start button.

As the second operation, when the first operation pushing the automatic travel start button 203 is performed, it is switched to another confirmation screen, and by operating the confirmation screen once again, it is switched to next mode. For example, when the automatic travel start button 203 is pushed, as shown in FIG. 9, a START button 203A and a CANCEL button 203B are appeared. Subsequently, when the START button 203A is pushed, it is shifted to the automatic travel control mode. When it is shifted to the automatic travel control mode, the screen is returned to that of FIG. 8. When a position to be pushed is mistaken, by pushing the CANCEL button 203B, the screen is returned to that of FIG. 8. The screen of the second operation is not limited to that of FIG. 9 and may be any screen in which continuation or cancellation can be selected and confirmed such as "yes" and "no".

The operation method of the second operation may be replaced with another operation. Namely, as a second embodiment, by long pressing of the automatic travel start button 203, it is shifted to the automatic travel control mode. As a third embodiment of the second operation, it may alternatively be configured that by pushing the automatic travel start button 203 twice continuously, it is shifted to the automatic travel control mode. As a fourth embodiment of the second operation, it may alternatively be configured that by pushing the automatic travel start button 203 (first operation), a color of the automatic travel start button 203 is changed, and by pushing it once again (second operation), it is shifted to the automatic travel control mode. As a fifth embodiment of the second operation, it may alternatively be configured that by sliding the automatic travel start button 203 (second operation) while performing long pushing of the automatic travel start button 203 (first operation), it is shifted to the automatic travel control mode. When the second operation is performed and it is shifted to the automatic travel control mode, a screen such as "it is shifted to the automatic travel control mode" may be displayed so that an operator can recognize the shift easily. It may alternatively be controlled that the screen is switched to full screen display when the first operation is performed.

As the above, the automatic travel start button 203 of the autonomously moving work vehicle 1 is displayed in the display device 113 and it is shifted to the automatic travel control mode by performing the second operation in addition to the first operation of the automatic travel start button 203. Accordingly, even when the screen of the display device 113 is touched unintentionally or the operation is mistaken, it is not shifted to the automatic travel control mode and the autonomously moving work vehicle 1 does not start travel suddenly, thereby preventing accident and the like.

After starting the automatic travel, concerning the automatic travel stop button 204, when the first operation pushing the automatic travel stop button 204 is performed, the screen is switched to another confirmation screen, and when the second operation is performed, the automatic travel and the work are stopped. Concerning the internet connection button 206, when the first operation pushing the internet connection button 206 is performed, the screen is switched to another confirmation screen, and when the second operation is performed, the remote control apparatus is connected to the internet and enters and displays the website set previously. Concerning the PTO on/off button 208, when the first operation pushing the PTO on/off button 208 is performed, the screen is switched to another confirmation screen, and when the second operation is performed, the PTO switching means 45 is operated so as to engage the PTO. In the state in which the PTO is engaged, when the first operation pushing the PTO on/off button 208 is performed, the screen is switched to another confirmation screen, and when the second operation is performed, the PTO is disengaged.

Similarly to the operation of the automatic travel start button 203, concerning the automatic travel stop button 204, the internet connection button 206 and the PTO on/off button 208, it may alternatively be configured that when the first operation is performed, instead of switching to another confirmation screen (screen of alternative of "yes" and "no"), by operating the second operation such as the second to fifth embodiments, it is shifted to the next mode.

Operations of the other buttons arranged in the remote control area 113A after starting the automatic travel are explained.

Figure 10:
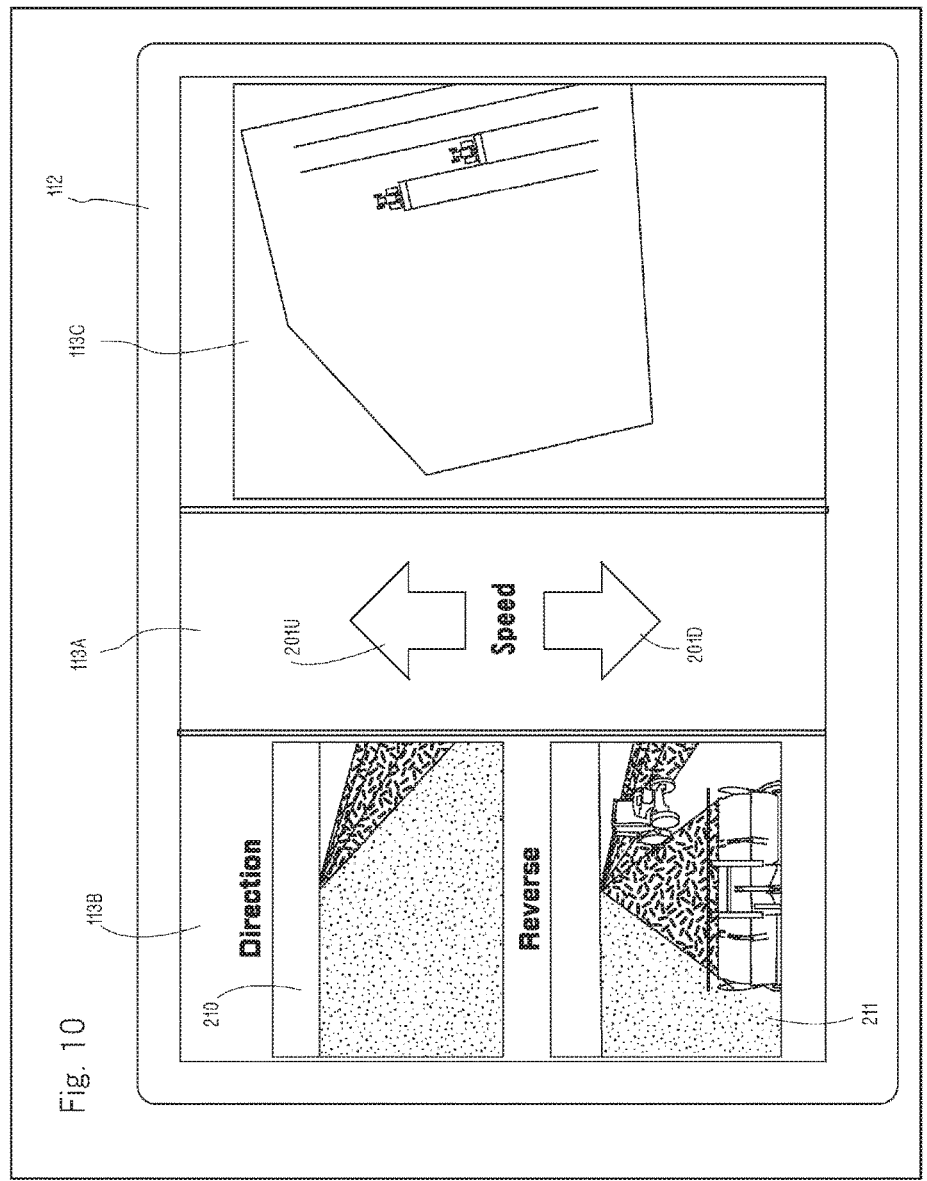
FIG. 10 is a drawing of the second operation screen after pushing a travel speed change button.

As shown in FIG. 8, the traveling speed increase button 201U and the traveling speed reduction button 201D are configured as one travel speed change button 201. When the first operation touching the travel speed change button 201 is performed, the screen is switched to another confirmation screen, and when the second operation is performed, the speed change means 44 is operated so as to change the speed for one stage. When the first operation touching the travel speed change button 201 is performed, in this embodiment, the screen is switched to a check confirmation screen shown in FIG. 10 in which increase or reduction is operated, and the traveling speed increase button 201U and the traveling speed reduction button 201D as second traveling speed change buttons for performing the second operations are displayed. By touching the traveling speed increase button 201U, the speed change means 44 is operated so as to increase the speed for one stage, and by touching the traveling speed reduction button 201D, the speed change means 44 is operated so as to reduce the speed for one stage. It may alternatively be controlled that the screen is switched to full screen display at the first operation and name and number of the speed change stage are indicated by popup and the screen is switched to a screen for the speed change.

Figure 11:
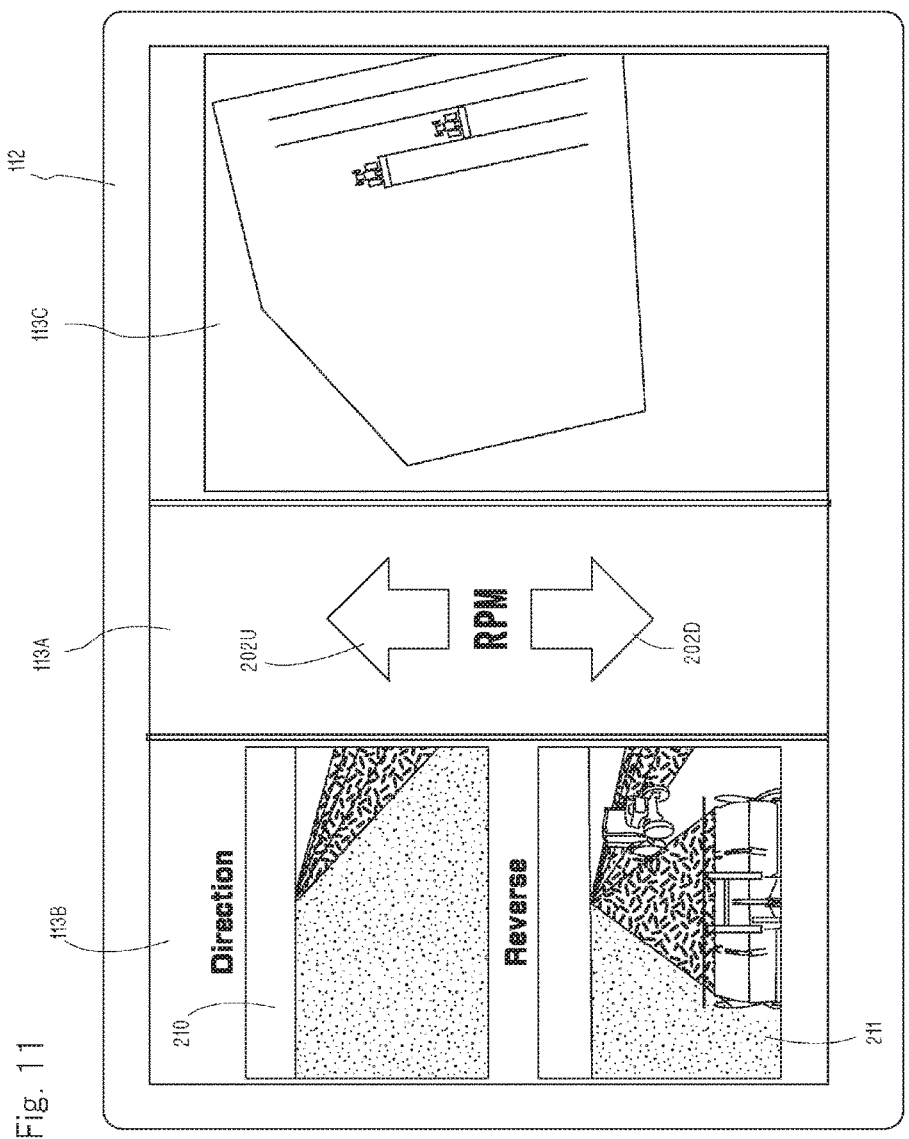
FIG. 11 is a drawing of the second operation screen after pushing an engine rotation speed change button.

As shown in FIG. 8, the engine rotation speed increase button 202U and the engine rotation speed reduction button 202D are configured as one engine rotation speed change button 202. When the first operation touching the engine rotation speed change button 202 is performed, the screen is switched to another confirmation screen, and when the second operation is performed, the accelerator actuator is operated so as to change the fuel injection amount. When the first operation touching the engine rotation speed change button 202 is performed, in this embodiment, the screen is switched to a check confirmation screen shown in FIG. 11 in which increase or reduction is operated, and the engine rotation speed increase button 202U and the engine rotation speed reduction button 202D as second engine rotation speed change buttons for performing the second operations are displayed. By touching the engine rotation speed increase button 202U, the accelerator actuator is operated and the fuel injection amount is increased so as to increase the engine rotation speed, and by touching the engine rotation speed reduction button 202D, the accelerator actuator is operated and the fuel injection amount is reduced so as to reduce the engine rotation speed. It may alternatively be controlled that the screen is switched to full screen display at the first operation and the engine rotation speed is indicated by popup in digital or analog and the screen is switched to a screen for the engine rotation speed. By touching continuously the traveling speed increase button 201U, the traveling speed reduction button 201D, the engine rotation speed increase button 202U or the engine rotation speed reduction button 202D, the increase or reduction amount can be changed quickly.

As shown in FIG. 8, the work machine lifting button 207U and the work machine lowering button 207D are configured as one work machine height change button 207.

Figure 12:
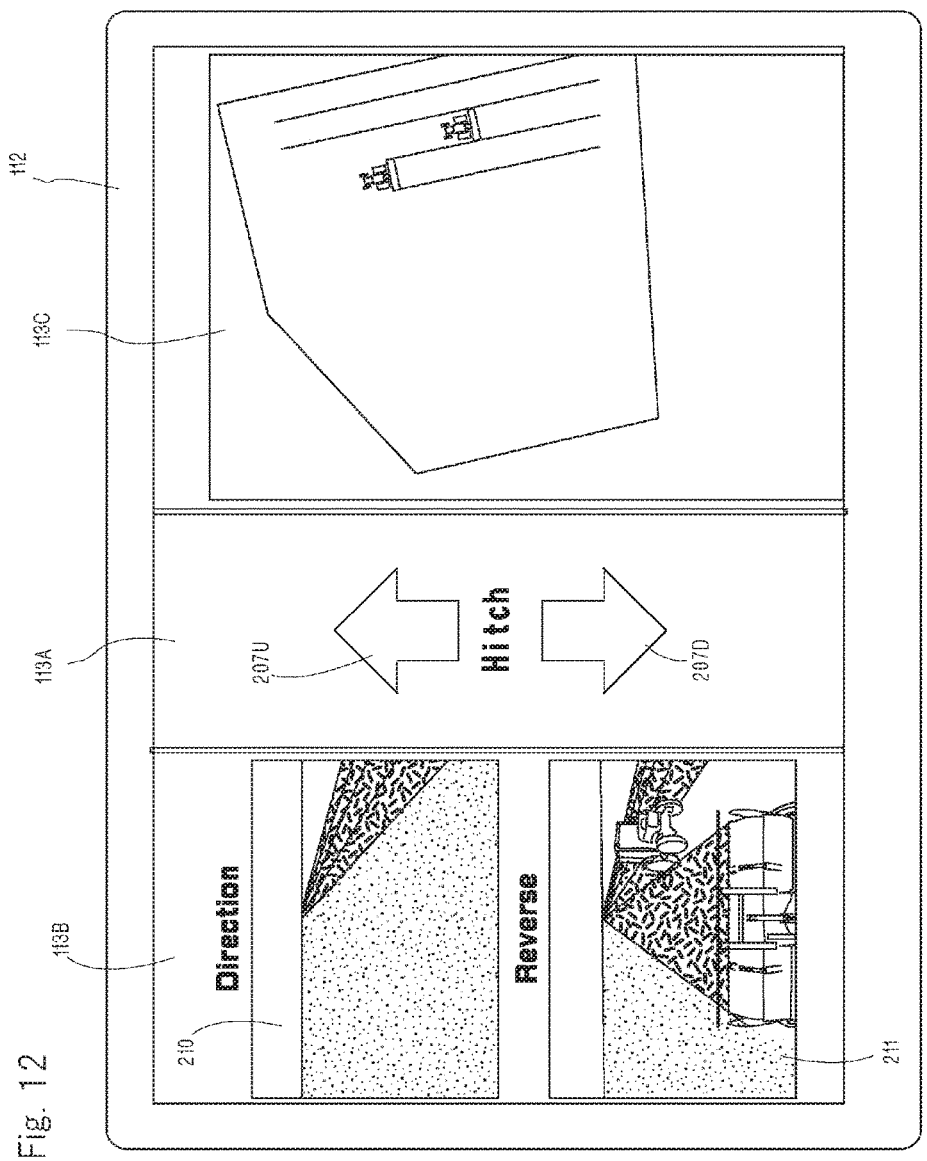
FIG. 12 is a drawing of the second operation screen after pushing a work machine height change button.

When the first operation touching the work machine height change button 207 is performed, the screen is switched to another confirmation screen, and when the second operation is performed, the lifting actuator 25 is operated so as to lift and lower the rotary tilling device 24. When the first operation touching the work machine height change button 207 is performed, in this embodiment, the screen is switched to a check confirmation screen shown in FIG. 12 in which increase or reduction is operated, and the work machine lifting button 207U and the work machine lowering button 207D as second work machine height change buttons for performing the second operations are displayed. By touching the work machine lifting button 207U, the lifting actuator 25 is operated so as to lift the rotary tilling device 24, and by touching the work machine lowering button 207D, the lifting actuator 25 is operated so as to lower the rotary tilling device 24. It may alternatively be controlled that the screen is switched to full screen display at the first operation and name and the height of the work machine (the rotary tilling device 24) is indicated by popup in digital or analog and the screen is switched to a screen for lifting and lowering of the work machine.

The circumference image area 113B includes a front screen 210 displaying an image of the front side of the vehicle body photographed by the camera 42F and a rear screen 211 displaying an image of the rear side of the vehicle body photographed by the camera 42R, and these screens are arranged vertically (longitudinally) in the circumference image area 113B so as to display the two screens. The image photographed by the rear camera 42R may be an image of an attachment part between the tractor and the work machine, an image of work state of the work machine, or an image of finish state of the work at the rear side.

By changing the photographing direction, an angle change means may be provided in support parts of the cameras 42F and 42R. It may alternatively be configured that the angle can be changed by an actuator and can be adjusted by the remote control apparatus 112.

The image displayed in the rear screen 211 is a mirror image (reversed laterally) so that an operator does not feel strange at the time of operation in the same direction as the traveling direction of the autonomously moving work vehicle 1. It may alternatively be configured that a switch means is provided and when an operator does not ride on the auxiliary moving work vehicle 100 and supervises and operates the autonomously moving work vehicle 1 at the front side thereof and facing it, the front screen 210 is a mirror image and the rear screen 211 is a real image.

Figure 4:
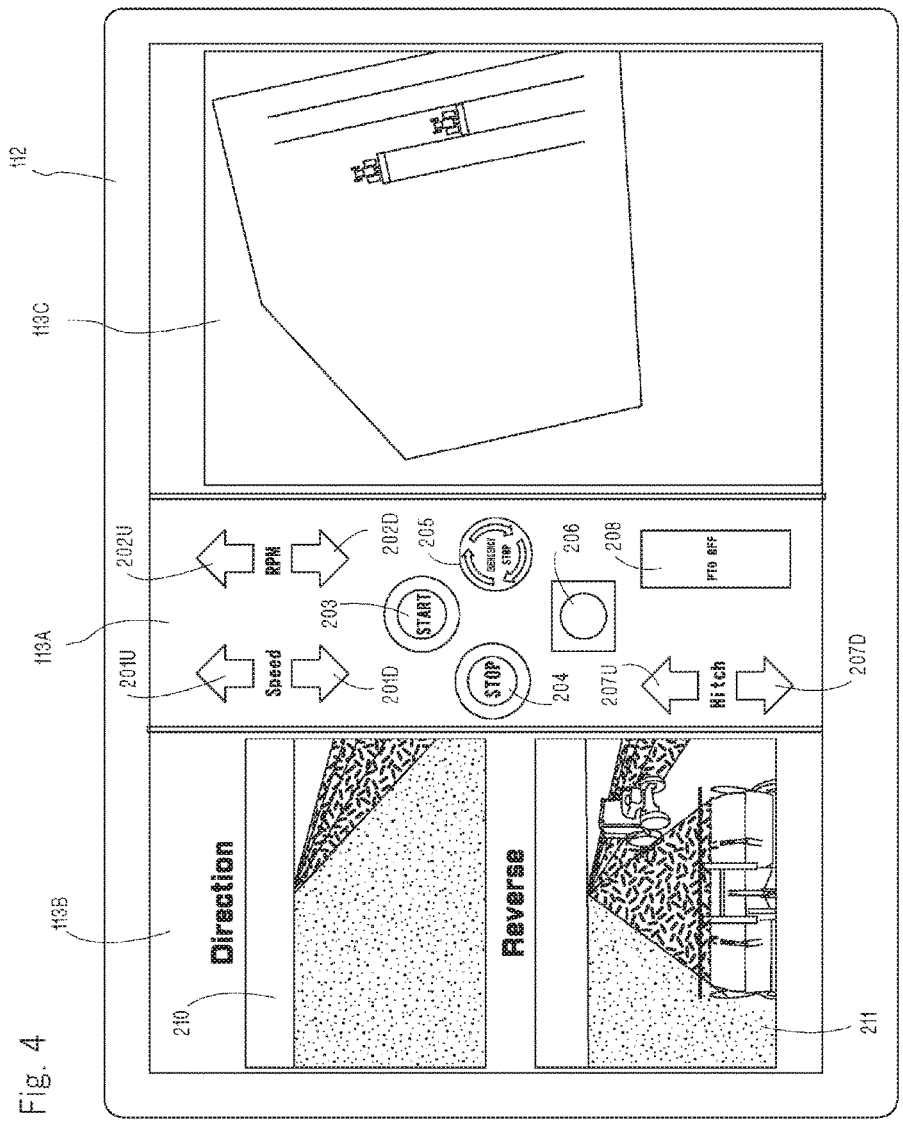
FIG. 4 is a drawing of a display device of the remote control apparatus.

In the circumference image area 113B, in the case in which the front screen 210 and the rear screen 211 are displayed and the autonomously moving work vehicle 1 travels autonomously (automatically), when the longitudinal traveling direction is changed, the vertical arrangement of the front screen 210 and the rear screen 211 is switched. For example, at the time of traveling forward, as shown in FIG. 4, the front screen 210 is arranged at an upper side and the rear screen 211 is arranged at a lower side, and at the time of switching from forward travel to rearward travel, the rear screen 211 is arranged at the upper side and the front screen 210 is arranged at the lower side.

In the switch of the display, the display is switched slightly before switching the traveling direction actually. Namely, the set travel route R is stored in the storage device 30*m* of the control device 30, and timings of switching from the forward travel to the rearward travel and from the rearward travel to the forward travel in the set travel route R are programmed, whereby the screen of the display device 113 is switched corresponding to a scheduled traveling direction at each set time at which the traveling direction is switched longitudinally. Concretely, before commanding switch of the longitudinal travel for a set time (or before a switching position of the longitudinal travel for a set distance), the display is switched vertically. For example, the switching of display of the screen is performed before operating a longitudinal travel switch actuator of the autonomously moving work vehicle 1 for several seconds (or after stopping the travel). By controlling the display device 113 as the above, an operator operating the remote control apparatus 112 can recognize that the longitudinal traveling direction of the autonomously moving work vehicle 1 is to be switched by the switch of the screen. Accordingly, if an obstacle exists oppositely to the traveling direction, an operation stopping the autonomously moving work vehicle 1 can be performed before traveling, whereby an accident can be prevented.

Figure 6:
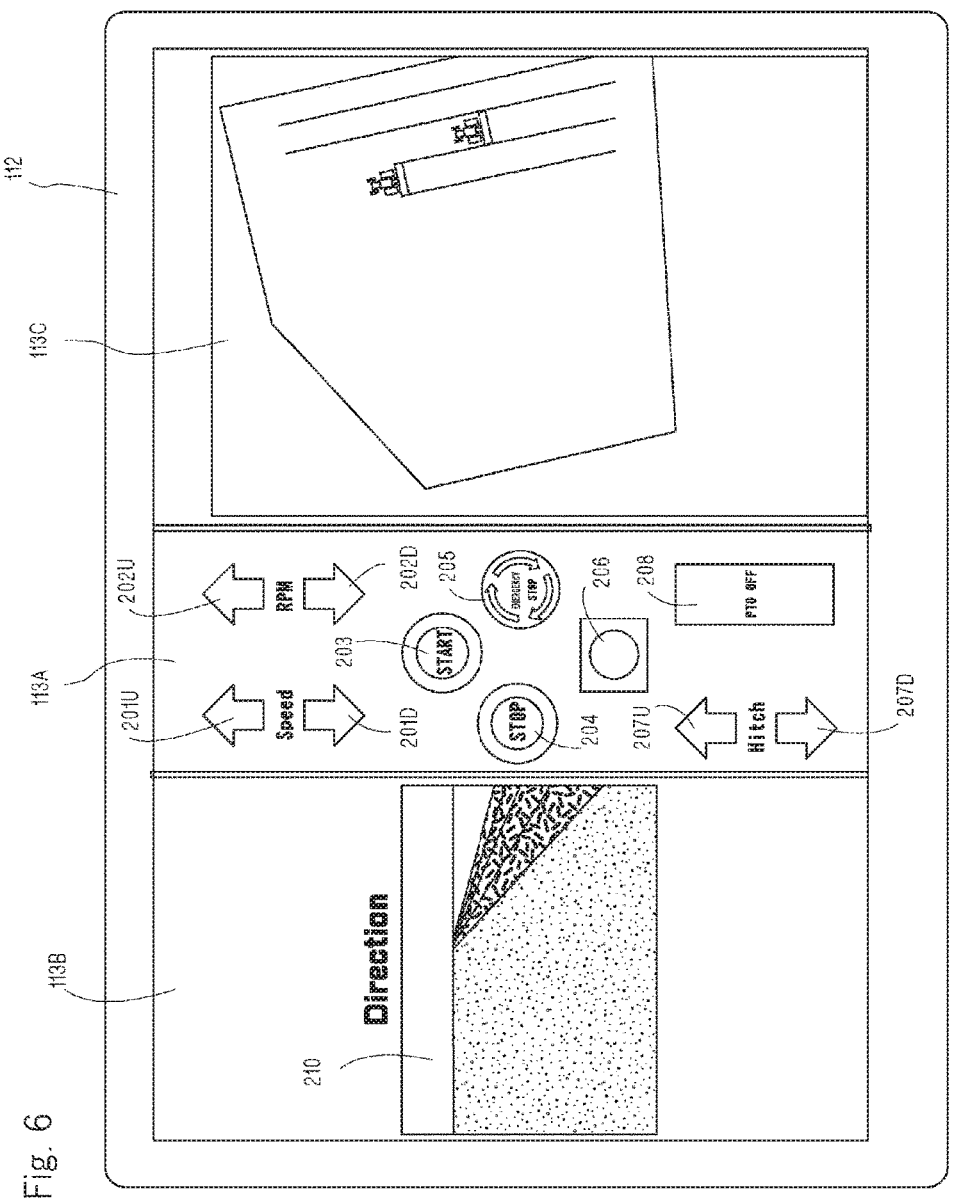
FIG. 6 is a drawing of a state in which one screen is displayed in a circumference image area.
Figure 7:
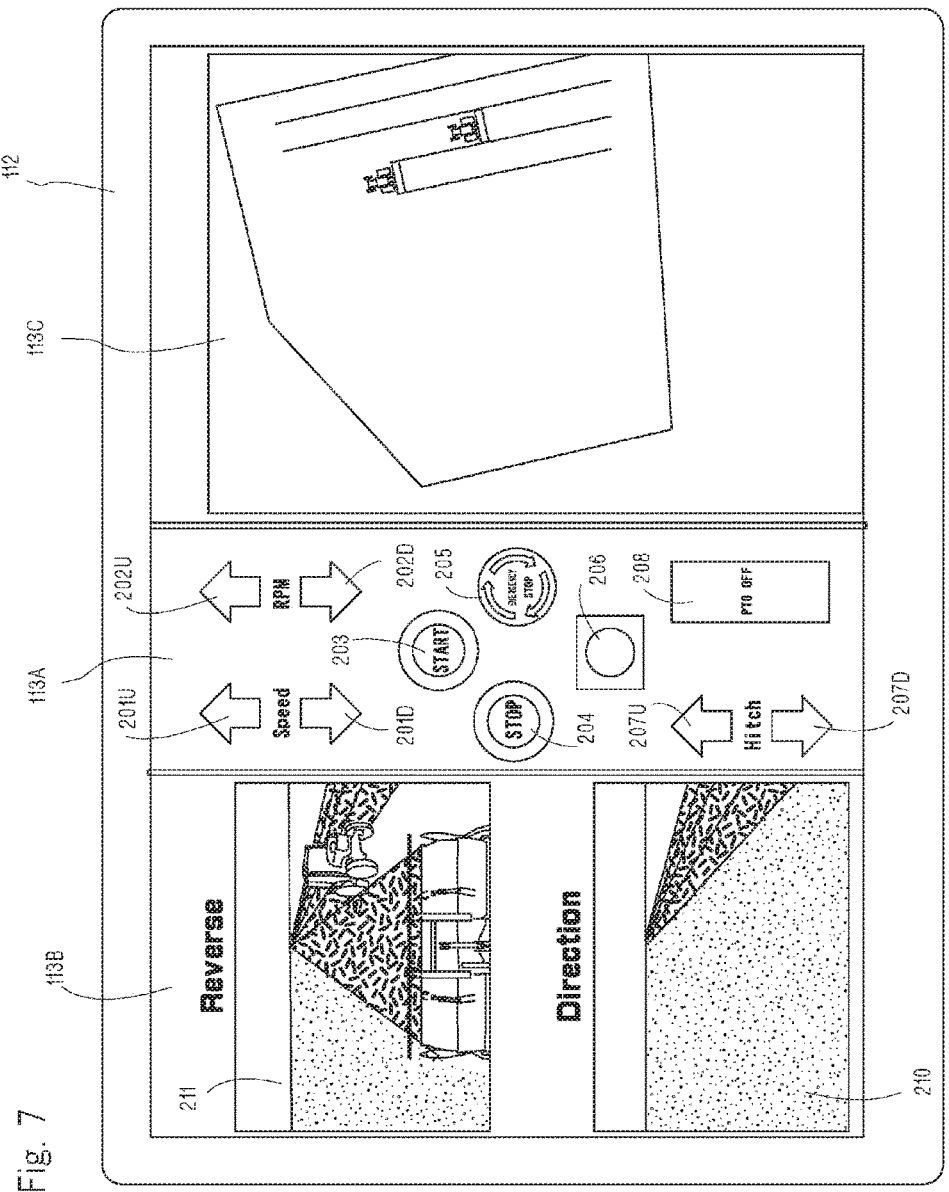
FIG. 7 is a drawing of a state in which a front screen and a rear screen of the circumference image area are switched upside down.

It may alternatively be configured that in the circumference image area 113B, not the two screens but one screen displaying the traveling direction is only displayed as shown in FIG. 6. Namely, at the time of traveling forward, the front screen 210 is displayed, and at the time of traveling rearward, the rear screen 211 is displayed. In this case, similarly to the above, the display of the front screen 210 and the rear screen 211 is switched slightly before switching the longitudinal traveling direction. In the case of displaying the one screen in the circumference image area 113B, normally, the traveling direction is only displayed. However since there is a case where the finish state after the work is required to be checked, a switch button for switching the display to the rear screen 211 may be provided, or it may alternatively be configured that the screen can be switched by an operation such as double-tapping.

In the display device 113, in addition to the remote control area 113A and the circumference image area 113B, a work state display area 113C displaying a map of the field on which the autonomously moving work vehicle 1 works, the set travel route R, an actual position, a worked position and the like can be displayed. In the work state display area 113C, two-dimensional display in which the set travel route overlaps the map, three-dimensional display and display of overhead view can be performed. A switch means may be provided for switching these displays.

The screens displayed in the circumference image area 113B and the work state display area 113C can be configured to be expanded and reduced. For example, in the case in which the finish after the work is wanted to be looked more accurately by the rear screen 211 of the circumference image area 113B, the screen may be expanded by pinch-out operation extending a distance between two fingers so as to be checked. In the work state display area 113C, in the case in which adjacent fields or surrounding ridges are wanted to be checked, the screen may be reduced by pinch-in operation reducing a distance between two fingers so as to be checked. A display position (photographing position) of the display screen may be enabled to be changed by drag operation.

The remote control area 113A, the circumference image area 113B and the work state display area 113C can be displayed simultaneously by being divided laterally or vertically. Namely, in the embodiment of FIG. 4, the circumference image area 113B, the remote control area 113A and the work state display area 113C are displayed simultaneously at the left side, the center and the right side respectively by dividing the screen into three so that the areas are concentrated to one terminal without providing a plurality of display devices, whereby attachment at the time of operation while riding on the auxiliary moving work vehicle 100 can be performed easily, and operation of check of the position and speed adjustment of the autonomously moving work vehicle 1 can be performed easily while looking the screen.

By arranging the remote control area 113A at the center and arranging the circumference image area 113B and the work state display area 113C at both the sides, the operation buttons for sudden stop, speed adjustment and the like of the autonomously moving work vehicle 1 which are important concerning the safety are arranged at the center, whereby the buttons are legible and can be operated quickly. The remote control apparatus 112 can be used as longwise. Namely, the display device 113 can be divided into three in the vertical direction. In the divided state, by dragging and moving in parallel a boundary part between either two of the remote control area 113A, the circumference image area 113B and the work state display area 113C, the display areas can be expanded and reduced so as to expand the screen wanted to be looked and to reduce the screen not necessary.

Figure 5:
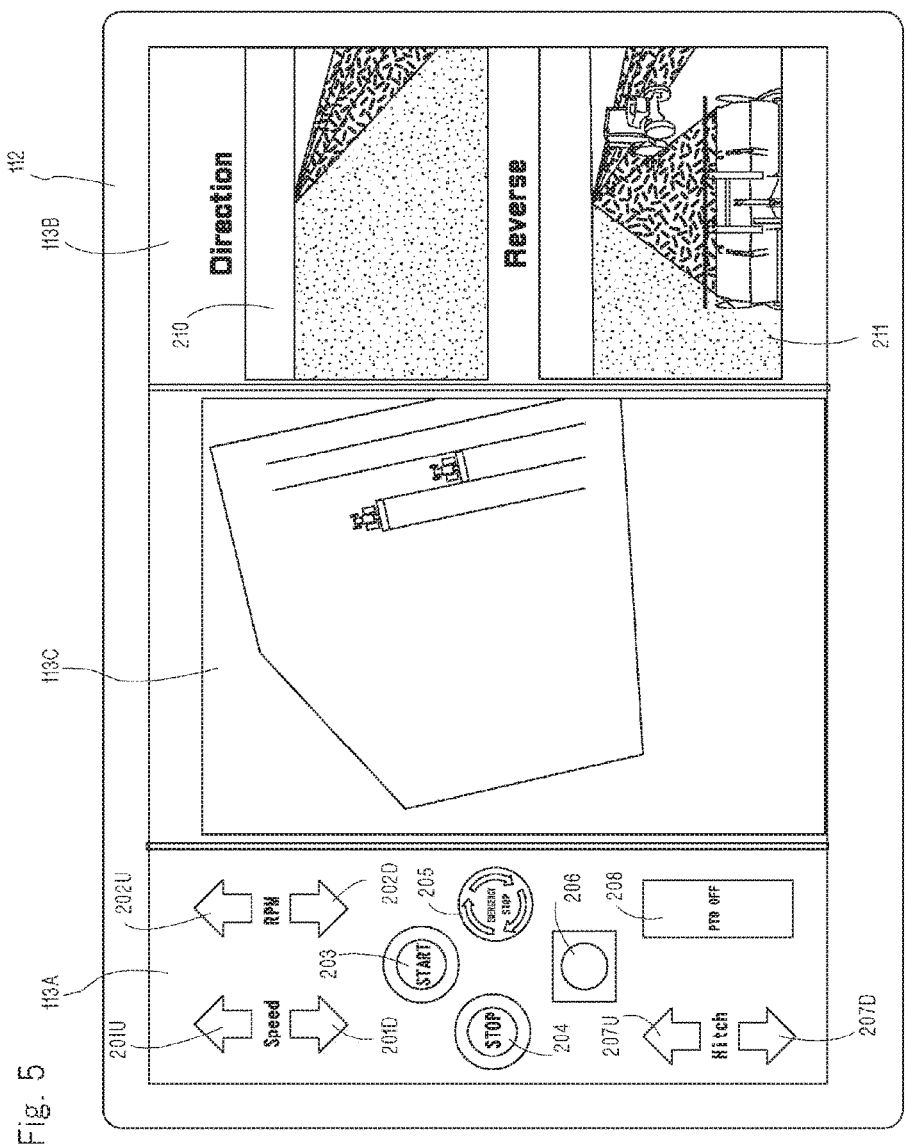
FIG. 5 is a drawing of a state in which a display screen of the display device is exchanged.

The display positions of the remote control area 113A, the circumference image area 113B and the work state display area 113C can be changed (exchanged) optionally so as to follow liking of a user or to be made easy to use. Namely, the remote control area 113A, the circumference image area 113B and the work state display area 113C can be arranged freely in consideration of liking and usability of the user. For example, as shown in FIGS. 4 and 5, by dragging a part of the screen, the remote control area 113A can be moved from the center to the left side and the circumference image area 113B can be moved to the right side. It may alternatively be configured that the circumference image area 113B and the work state display area 113C are aligned vertically in the left side and the remote control area 113A is arranged in the right side.

Selection of plural display and full screen display can be changed optionally so as to improve visibility and operability. Namely, only the remote control area 113A may be full screen-displayed so as to display the buttons largely thereby preventing mistake of operation, or the remote control area 113A and the work state display area 113C may be displayed so that the autonomously moving work vehicle 1 can be operated while the work position is checked.

INDUSTRIAL APPLICABILITY

The present invention can be used for a display device provided in a remote control apparatus which enables remote control of a construction machine, an agricultural vehicle and the like which can travel autonomously.

DESCRIPTION OF NOTATIONS 1 autonomously moving work vehicle
30 control device
42F and 42R cameras
110 and 111 communication devices
112 remote control apparatus
113 display device
113A remote control area
113B circumference image area
113C work state display area
119 control device

What is claimed is:

1. A remote control apparatus for controlling an autonomously moving work vehicle configured to perform travel and work automatically along a set travel route using a satellite positioning system, the remote control apparatus comprising:
   a communication device;
   a control device coupled to the communication device and configured to wirelessly communicate with the autonomously moving work vehicle via the communication device; and
   a display device coupled to the control device, the display device comprises:
      a remote control area configured to enable operation of the autonomously moving work vehicle; and
      an image area configured to display one or more images photographed by at least one camera attached to the autonomously moving work vehicle, the one or more images including a front side view and a rear side view,
      wherein, during travel of the autonomously moving work vehicle along the set travel route, the display device is configured to switch between presentation of the front side view and presentation of the rear side view prior to a change in traveling direction of the autonomously moving work vehicle, the change in a travel direction corresponding to a scheduled traveling direction of the set travel route.

2. The remote control apparatus according to claim 1, wherein the display device is further configured to display a work state display area, the work state display area configured to display a map of a field that corresponds to the set travel rout, the set travel route, a position of the autonomously moving work vehicle, and a worked position of the autonomously moving work vehicle.

3. The remote control apparatus according to claim 2, wherein the display device is configured to divide a screen laterally or vertically to concurrently display the remote control area, the image area, and the work state display area.

4. The remote control apparatus according to claim 2, wherein the display device is further configure to receive a selection for plural display of the remote control area, the image area and the work state display area, or full screen display.

5. The remote control apparatus according to claim 1, wherein:
a camera configured to photograph the front side view and the rear side view is attached to the autonomously moving work vehicle,
a front screen configured to display an image of the front side view of the autonomously moving work vehicle photographed by the camera and a rear screen configured to display an image of the rear side view are provided in the display device, and
the display device is configured to be switched between two-display displaying the front screen and the rear screen and one-display displaying only a traveling direction which corresponds to the front screen or the rear screen.

6. The remote control apparatus according to claim 5, wherein the display device is configured to switch between the presentation of the front side view and the rear side view in either of the one-display or the two-display.

7. The remote control apparatus according to claim 2, wherein:
the display device includes a screen, and
the display device is further configured to laterally or vertically divide the screen into a first portion, a second portion, and a third portion to concurrently display the remote control area, the image area, and the work state display area.

8. The remote control apparatus according to claim 7, wherein the display device is further configure to display:
the remote control area via the first portion of the screen, the image area via the second portion, and
the work state display area via the third portion.

9. The remote control apparatus according to claim 3, wherein the remote control area is displayed at a position between the image area and the work state display area, and wherein the switch between the presentation of the front side view and the presentation of the rear side view provides an indication that the travel direction of the autonomously moving work vehicle is about change.

10. The remote control apparatus according to claim 5, wherein the control device is configured to initiate a change in the position of the camera such that the at least one camera changes between capture of the front side view and capture of the rear side view.

11. The remote control apparatus according to claim 1, wherein the display devices comprises a touch screen, and wherein the change in direction comprises a change between a forward direction of the autonomously moving work vehicle and a reverse direction of the autonomously moving work vehicle.

12. The remote control apparatus according to claim 1, wherein the display device is configured to switch between the presentation of the front side view and the presentation of the rear side view based on a set time prior to the change in the travel direction.

13. The remote control apparatus according to claim 12, wherein the set travel route includes timings of switching, and wherein the display device is configured to switch between presentation of the front side view and presentation of the rear side view based on the timings.

14. The remote control apparatus according to claim 1, wherein the display device is configured to switch between the presentation of the front side view and the presentation of the rear side view based on the autonomously moving work vehicle being positioned along the set travel route at a set distance before a travel direction switching position of the set travel route.

15. The remote control apparatus according to claim 1, wherein:
the image area is configured to in a two-image-display having a vertical arrangement in which a first image is positioned at an upper side of the two-image-display and a second image is positioned at a lower side of the two-image-display, and
to switch between the presentation of the front side view and the presentation of the rear side view, the display device is configured to:
in association with a change in travel direction from a forward travel direction to a reverse travel direction, change the first image from the front side view to the rear side view and change the second image from the rear side view to the front side view, and
in association with a change in travel direction from the reverse travel direction to the forward travel direction, change the first image from the rear side view to the front side view and change the second image from the front side view to the rear side view.

16. The remote control apparatus according to claim 5, wherein presentation of the front side view and the rear side view is based on a position of the remote control apparatus with respect to the autonomously moving work vehicle.

17. The remote control apparatus according to claim 16, wherein the display device is configured to:
display a mirror image of the rear side view when the remote control apparatus is traveling in the same direction of travel as the autonomously moving work vehicle and is positioned in behind the autonomously moving work vehicle, and
display a mirror image of the front side view when the remote control apparatus is traveling in the same direction of travel as the autonomously moving work vehicle and is positioned in front of the autonomously moving work vehicle.

18. A remote control apparatus for controlling an autonomously moving work vehicle configured to perform travel and work automatically along a set travel route using a satellite positioning system, the remote control apparatus comprising:
a communication device;
a control device coupled to the communication device and configured to wirelessly communicate with the autonomously moving work vehicle via the communication device; and a display device coupled to the control device, the display device comprises:
- a first portion associated with a remote control area configured to enable operation of the autonomously moving work vehicle, and
- a second portion associated with an image area configured in a multi-image-display to display images captured by one or more cameras associated with the autonomously moving work vehicle, the one or more images including a front side view of the autonomously moving work vehicle and a rear side view of the autonomously moving work vehicle, wherein, when the remote control apparatus is traveling in the same direction of travel as the autonomously moving work vehicle, the display device is configured to present a modified one of the front side view and the rear side view as a mirror image based on a position of the remote control apparatus with respect to the autonomously moving work vehicle.

19. The remote control apparatus of claim 18, the display device further comprises a third portion associated with a work state display area configured to display a map of a geographic region that corresponds to the set travel route.

20. The remote control apparatus of claim 19, wherein:
the display device is further configured to concurrently display the remote control area via the first portion, the image area via the second portion, and the work state display area via the third portion such that the first portion is positioned between the second portion and the third portion, and
activation, via the remote control area, of an automatic travel control mode to cause the autonomously moving work vehicle to travel along the set travel route comprises a multi-input operation.

* * * * *